(12) United States Patent
Reinke

(10) Patent No.: US 8,020,518 B1
(45) Date of Patent: Sep. 20, 2011

(54) MULTI-CONFIGURATION ANIMAL PLAY STRUCTURE

(76) Inventor: Colleen Reinke, Bismarck, ND (US)

( * ) Notice: Subject to any disclaimer, the term of this patent is extended or adjusted under 35 U.S.C. 154(b) by 11 days.

(21) Appl. No.: 12/379,893

(22) Filed: Mar. 4, 2009

(51) Int. Cl.
*A01K 1/03* (2006.01)
*A01K 1/035* (2006.01)

(52) U.S. Cl. .................................. 119/482; 119/706

(58) Field of Classification Search .............. 119/482, 119/485, 452, 455, 702, 706, 707; 482/35, 482/36
See application file for complete search history.

(56) References Cited

U.S. PATENT DOCUMENTS

| | | | | |
|---|---|---|---|---|
| 275,027 A * | 4/1883 | Drake | | 108/106 |
| 311,793 A * | 2/1885 | Stranders | | 446/105 |
| 1,358,119 A * | 11/1920 | Shrock | | 119/431 |
| 3,774,576 A * | 11/1973 | Moore | | 119/480 |
| 3,948,581 A * | 4/1976 | Helman et al. | | 312/198 |
| 4,497,279 A * | 2/1985 | Bell | | 119/706 |
| 5,050,536 A * | 9/1991 | Baker | | 119/499 |
| 5,078,094 A * | 1/1992 | Hoover | | 119/707 |
| 5,080,042 A * | 1/1992 | Rubin | | 119/706 |
| 5,577,466 A * | 11/1996 | Luxford | | 119/706 |
| 6,152,553 A * | 11/2000 | Wunderlich | | 312/265.2 |
| 6,378,463 B1 * | 4/2002 | Simmons | | 119/707 |
| D476,780 S * | 7/2003 | Cheshire | | D30/108 |
| 6,886,495 B1 * | 5/2005 | Madden et al. | | 119/482 |
| 2005/0284407 A1 * | 12/2005 | DeRaspe-Bolles et al. | | 119/706 |

* cited by examiner

*Primary Examiner* — Rob Swiatek
*Assistant Examiner* — Ebony Evans

(57) ABSTRACT

A multi-configuration structure including a base member, a plurality of cylindrical tubular spacers and a plurality of shelf members. The structure is assembled by threadably inserting the male connectors of a first set of spacers into the threaded recesses of the base member, aligning the assembly holes of a shelf member with the threaded recesses of the first set of spacers, inserting the threaded male connectors of a second set of spacers into and through the assembly holes of the shelf member and threadably inserting the male connectors into the threaded recesses of the first set of spacers, installing additional shelf members, spacers and walls in a configuration desired by the user.

3 Claims, 6 Drawing Sheets

MULTI-CONFIGURATION ANIMAL PLAY STRUCTURE

FIELD OF THE INVENTION

The present invention relates generally to a multi-configuration and multi-purpose shelving structure. In a further and more specific aspect, the present invention concerns an easily assembled and disassembled multi-purpose animal play structure which can be constructed in a variety of configurations.

BACKGROUND OF THE INVENTION

A variety of structures and devices have been made for cats and other pets to satisfy their natural need to climb, play, and rest on elevated areas. Typical pet structures and devices for this purpose, however, are either very large and cumbersome which cannot be easily and quickly disassembled, or limited to small scratching devices. Large freestanding animal structures are often constructed of wood with carpet covering and consist of long and heavy sidepieces. These large structures are cumbersome both for the pet owner to assemble and maintain, as well as for the retailer to acquire and stock for sale.

Attempts at workable animal structures have also suffered from a lack of flexibility in their configuration. Various attempts have been made to increase the flexibility and ease of use of such structures using detachable elements. Such attempts have been largely unsuccessful, however, due to manufacturing costs and design deficiencies.

It is conventional to provide play and exercise structures, such as posts, poles and beams, for household pets. For example, poles having platforms or decks upon which the cat can climb and perch, are illustrated in U.S. Pat. Nos. 3,595,209; 3,479,991; and 3,479,990. Structures upon which cats can climb and sharpen their claws have also been suggested, as illustrated in U.S. Pat. No. 4,112,873.

U.S. Pat. No. 3,595,209, issued to Parker, describes an exercise pole assembly for cats. The pole extends between the floor and ceiling of a room, and consists of a plurality of sections held in vertical orientation by dowels. The dowels are removable to allow the posts to be easily disassembled to move the assembly. The dowels fit through optional platforms to secure the platforms between the sections. The pole is held in place by a spring bias force exerted between the top section and the top platform while the top platform is in engagement with the ceiling.

U.S. Pat. No. 4,497,279, issued to Bell, describes an animal play structure comprising four parallel posts. The posts have apertures therein to receive rods, which connect the posts together. The rods also act as supports for the platforms. Ramps are connected to rods at different levels to allow the animal to move from a platform at one level to a platform at a different level. Each pole is made of a plurality of sections, and are vertically aligned by dowels.

U.S. Pat. No. 3,479,991, issued to Lichtenberger, describes an animal climbing structure consisting of a plurality of tubular sections oriented vertically on top of one another. The structure is placed between two surfaces, such as a floor and a ceiling, and is removably fixed in that position by a thread extendable and retractable plate located at the bottom of the structure. The sections are held together by plugs, one end of which is fixed inside one of the sections, and the other end of which forms a male connector for insertion into the corresponding section. Platforms are mounted on the structure between the sections by placing the male portion of the plug through an aperture in the platform to secure the platform in its position. The exterior of each section and platform is covered by a suitable traction surface, such as carpet, to allow the animal to scratch and climb.

U.S. Pat. No. 3,479,990, issued to Crow, describes a cat tree consisting of a tubular structure extending between a floor and a ceiling. The tube consists of a plurality of sections, in this case three, with the middle tube section having crimped ends. The crimped ends fit into the tubular ends of the top tube section and the bottom tube section to releasably secure the three tubes together in a vertical orientation. The bottom tube section is attached to a platform, which sits on the floor and acts as a base. A plunger is located in the top tube section, and is longitudinally extendable therefrom. The plunger extends to engage the ceiling, and is fixed at any desired extended position by a set screw. The plunger pushes against the ceiling, while the base engages the floor, thus keeping the structure in place. Platforms are located in fixed positions along the structure.

U.S. Pat. No. 4,790,265, issued to Manson, describes a cat scratching pole and exercise structure consisting of two posts fixedly mounted on a base and spaced apart from one another. The two posts are connected by a rod to allow the cat to walk between the posts, among other things. The posts and base are covered by a pile material adequate for cat scratching.

The products currently available for use as play structures for small animals have several limitations that effect their utility and function. Several products require a floor and ceiling to be relatively close together in order for the structure to be adequately supported. Many products available for use as play structures for small animals have a substantially fixed configuration and are not meant to be modified once installed. If the structures are able to be modified, then only a few minor parts are repositionable within the framework of the existing structure.

There is a need for a modular, reconfigurable structure that is attractive to and usable by cats and other small animals, while providing ease of assembly, storage and maintenance both to pet owners and retailers.

SUMMARY OF THE INVENTION

The present invention in general terms concerns a modular structure for use by small animals or for use in displaying items in a home, retail establishment or a trade show. The structure of the present invention overcomes many of the aforementioned limitations and problems. The structure is easily constructed, modified, and disassembled to require only limited storage space.

In general terms, and defining the invention in one aspect thereof, a modular structure is provided which comprises: a base member with a plurality of threaded axial recesses maintained within the base member; a plurality of cylindrical tubular spacers which spacers may be of differing lengths with each spacer having a first end and a second end with a threaded male connector set within the interior of the first end and a threaded recess set within the interior of the second end; and a plurality of shelf members which shelf members are of a variety of shapes with each shelf member having a plurality of openings extending from the top side to the bottom side of the shelf member.

To assemble the modular structure, the threaded male connector in the first ends of a desired number of first spacers are threadably attached to the threaded recesses maintained within the base member. One or more shelf members are arranged upon the second ends of the first spacers so that openings in the shelf members are aligned with the second end of each first spacer. The threaded male connectors extending from the first end of second spacers are inserted through the shelf member openings and threadably attached within the threaded recesses of the second end of the first spacers. One or more shelf members are then arranged upon the second ends of the second spacers so that openings in the shelf members are aligned with the second end of each second spacer.

The process set forth above can be continued until the desired configuration has been achieved. The spacers and shelf members can be arranged in a variety of configurations so as to fit within a particular room or retail space. Therefore, a general object of the present invention is to provide a modular, reconfigurable structure that is attractive to and usable by small animals and retailers.

A further objective of the present invention is to provide a modular and reconfigurable structure which is easy to assemble.

It is the further object of the present invention to provide a modular and reconfigurable structure which is easy to disassemble and can be stored in a relatively small area.

It is a further object of the present invention to provide a modular and reconfigurable structure which requires minimal maintenance.

It is a further object of the present invention to provide shelf members of differing sizes and configurations.

These, and other, aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DETAILED DESCRIPTION OF THE PREFERRED EMBODIMENTS

The present invention and the various features and advantageous details thereof are explained more fully with reference to the non-limiting embodiments described in the following description.

Figure 1:
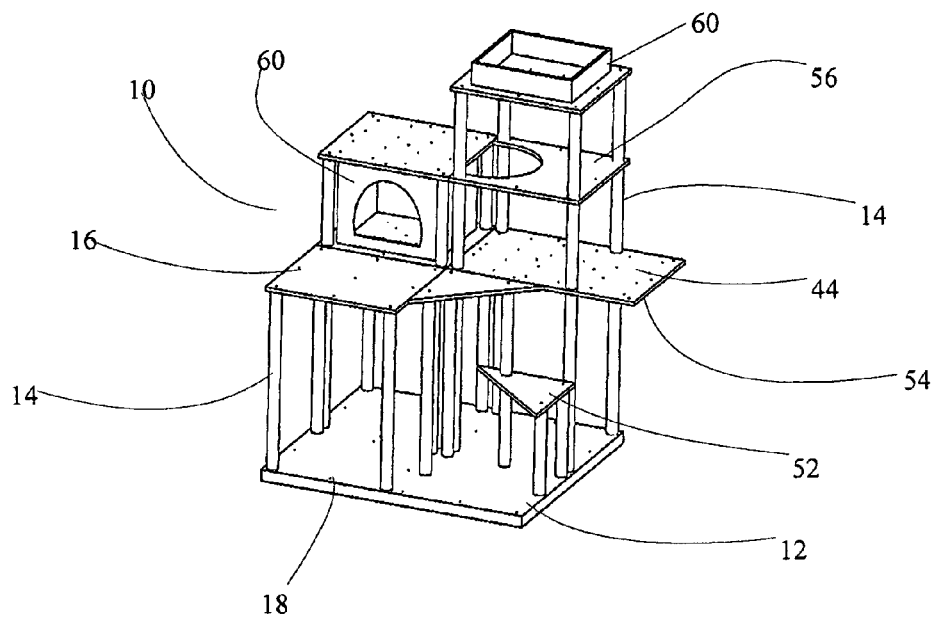
FIG. 1 is a perspective view of the multi-configuration animal play structure with the preferred embodiments of the present invention.

Referring first to FIG. 1, there can be seen a perspective view of an assembled modular multi-configuration structure, generally designated 10, according to the present invention. As illustrated, the structure 10 includes a base member 12, a plurality of cylindrical tubular spacers 14 and a plurality of shelf members 16. The assembled structure 10 has been shown with a variety of cylindrical tubular spacers 14 and shelf members 16. As can be readily appreciated, the precise configuration of the assembled structure 10 is dependent upon the number of cylindrical tubular spacers 14 and shelf members 16 used and the imagination of the person assembling the structure 10.

Figure 2A:
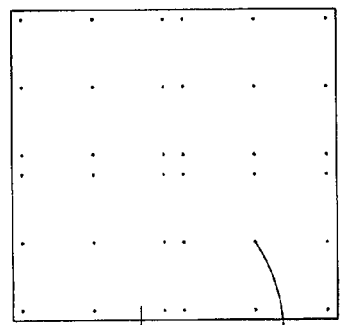
FIG. 2A is a top perspective view of a square shaped base members with axial recesses in accordance with the preferred embodiments of the present invention.
Figure 2B:
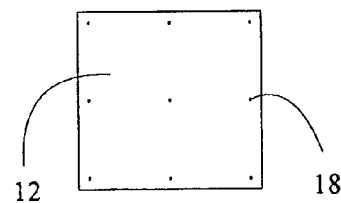
FIG. 2B is a top perspective view of a square shaped base member with axial recesses in accordance with the preferred embodiments of the present invention.
Figure 2C:
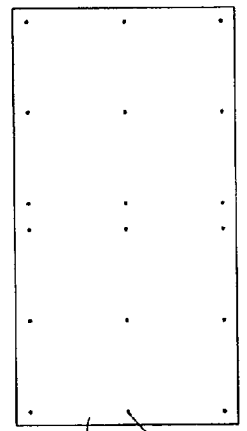
FIG. 2C is a top perspective view of a rectangular shaped base member with axial recesses in accordance with the preferred embodiments of the present invention.
Figure 2D:
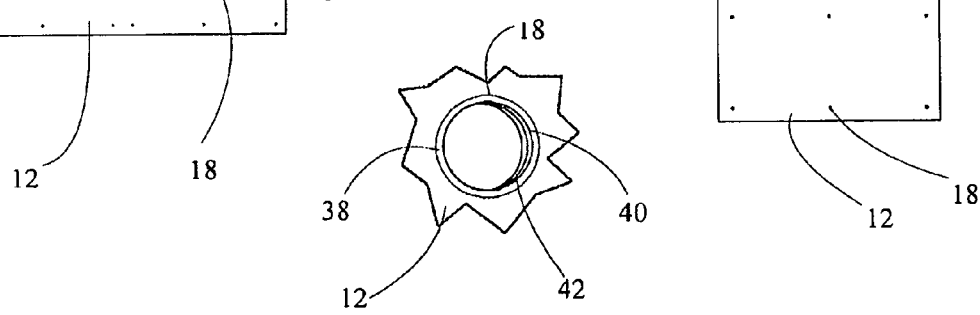
FIG. 2D is an exploded view of the axial recess of the base members in accordance with the preferred embodiments of the present invention.

Referring to FIGS. 2A-2C, the base member 12 is a rectangularly shaped solid surface which can be in a variety of sizes to accommodate the desired structure configuration. The base member 12 rests on the surface and supports the linearly connected spacers 14 in a vertical orientation relative to the base member 12. The base member 12 supports the structure in its entirety, eliminating the need to support the structure by other means. The base member 12 has adequate dimensions and mass to keep the play structure from tipping over when being used. Each base member 12 contains a plurality of threaded recesses 18. The threaded recesses 18, as shown in FIG. 2D, comprise a circular collar 38 having a threaded axial recess 40 defining an interior cylindrical wall 42.

Figure 3:
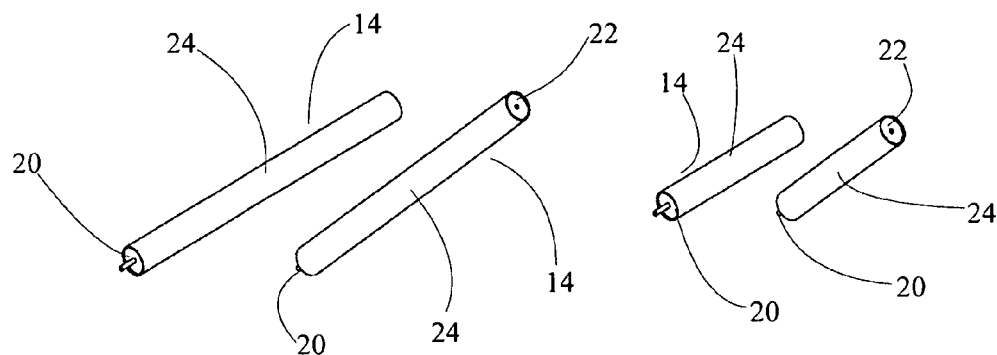
FIG. 3 is a side perspective view of the cylindrical tubular spacers in accordance with the preferred embodiments of the present invention.
Figure 5:
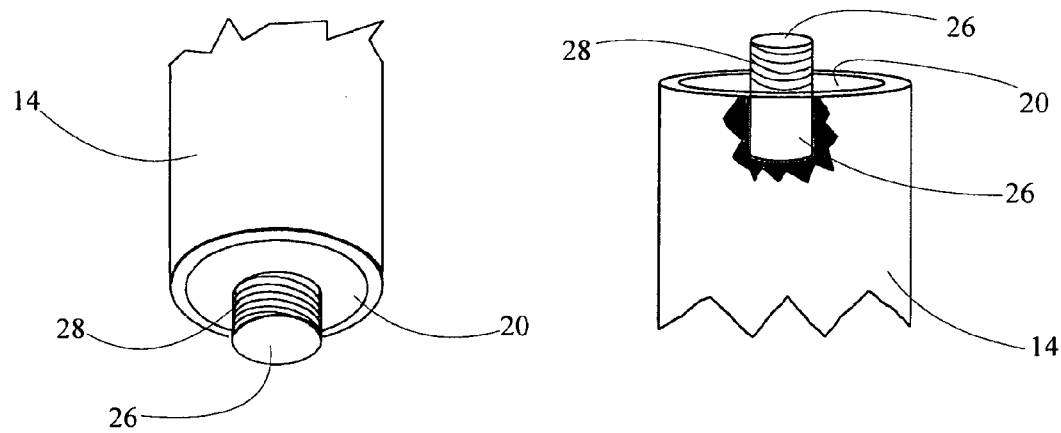
FIG. 5 is a side perspective view of the threaded male connector of the cylindrical tubular spacers in accordance with the preferred embodiments of the present invention.
Figure 6:
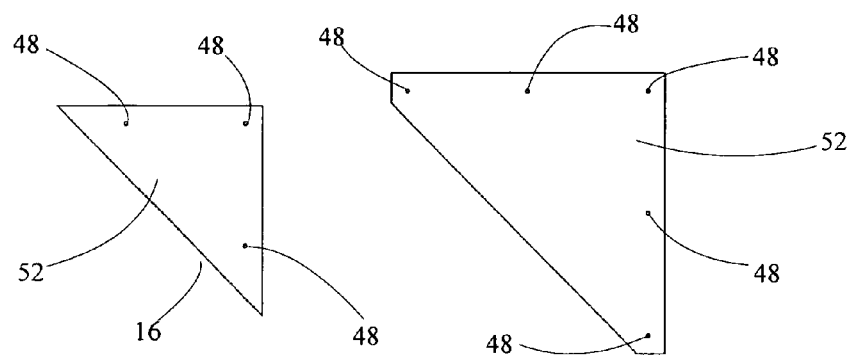
FIG. 6 is a top perspective view of triangular shaped shelf members in accordance with the preferred embodiments of the present invention.
Figure 7:
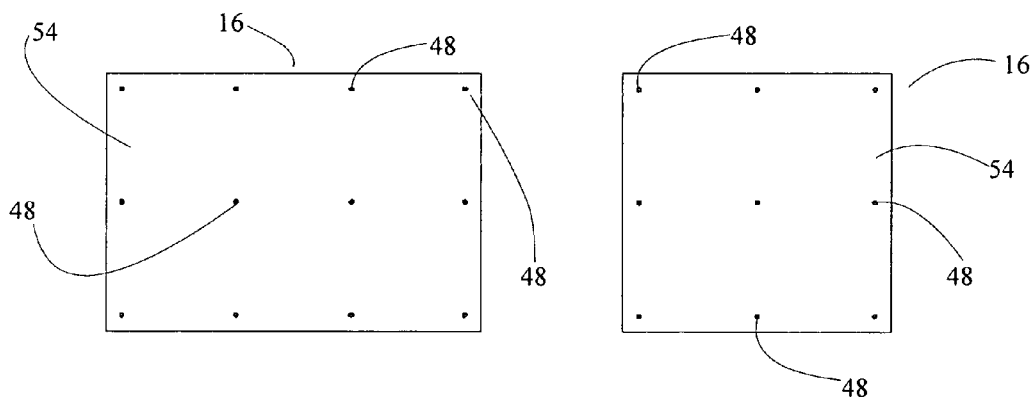
FIG. 7 is a top perspective view of rectangular shaped shelf members in accordance with the preferred embodiments of the present invention.
Figure 8:
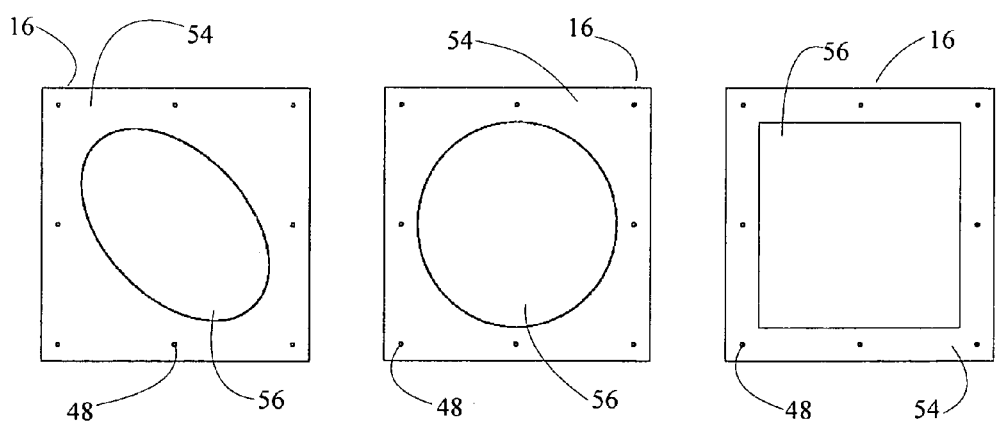
FIG. 8 is a top perspective view of shelf members having openings in accordance with the preferred embodiments of the present invention.
Figure 9:
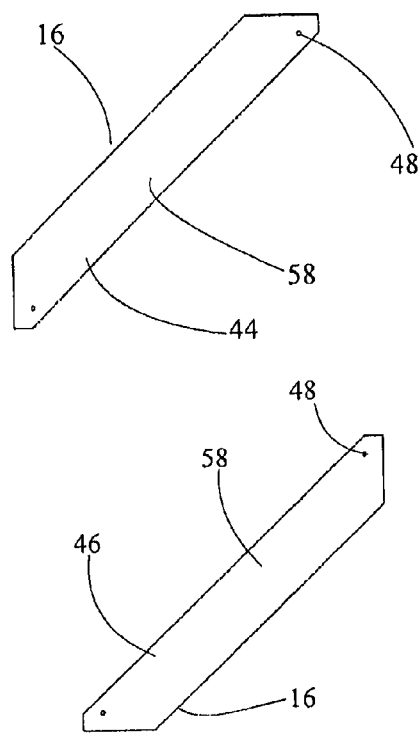
FIG. 9 is a top perspective view of cat-walk shaped shelf members in accordance with the preferred embodiments of the present invention.

Referring to FIG. 3, the spacers 14 are cylindrical and tubular in shape and are provided in a variety of lengths. Each spacer 14 has a first end 20 and an opposing second end 22 with the space between the first end 20 and the second end 22 defining a perimeter 24. A threaded male connector 26 is set within the interior area of the first end 20 of the spacer 14 such that only the threaded portion 28 of the male connector 26 extends beyond the first end 20 of the spacer 14, as shown in FIG. 5. The threaded portion 28 is cylindrical in shape and defines a perimeter.

Figure 4:
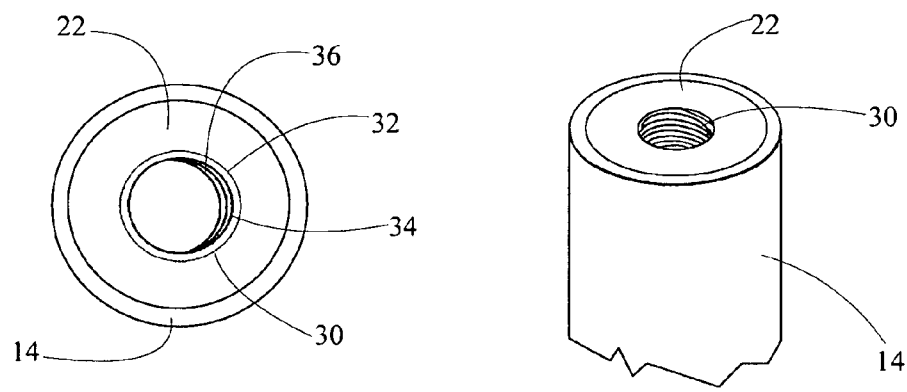
FIG. 4 are exploded top and side views of the threaded axial recess of the cylindrical tubular spacers in accordance with the preferred embodiments of the present invention.

A threaded recess 30 is maintained within the interior area of the second end 22 of the spacer 14. The threaded recess 30, as shown in FIG. 4, comprises a circular collar 32 having a threaded axial recess 34 defining an interior cylindrical wall 36 for threadably receiving the threaded portion 28 of the male connector 26. The threaded male connector 26 is threadably receivable in the threaded recess 30 to releasably connect the two axially aligned spacers 14 together.

In this type of embodiment, the spacers 14 have one end 20 defining a threaded male connector 26 and an opposing second end 22 defining a threaded recess female connector 30 enabling adjacent spacers 14 to be connected in a linear orientation. The threaded connection between the male connector 26 and the threaded recess 30 offer the user a releasable yet strong connector to connect all the separate components of the structure together with adequate strength to withstand the forces applied to the structure during use, and also allow the user to easily disassemble or reassemble in a different configuration.

To this end, the threaded male connectors 26 of the first ends 20 of a first set of spacers 14 are threadably received within the desired threaded recesses 18 of the base member 12. Once attached, the perimeter 24 of the spacers 14 extend vertically from the base member 12. A shelf member 16 is then placed on the second end 22 of the first set of spacers 14 so as to result in the base member 12 and the shelf member 16 being substantially parallel. Each shelf member 16 has a top side 44 and a bottom side 46 and contain a plurality of assembly holes 48, sized to allow passage of threaded male connectors 26.

The shelf members 16 can be removably inserted between the spacers 14 to construct a play structure 10 in accordance with the desires of the user. The shelf members 16, while embodying any variety of configurations, all basically serve as a supporting platform. The shelf members 16 simply fit between adjacent spacers 14 and are thus interposed between the first ends 20 and second ends 22 of adjacent spacers 14.

Referring to FIGS. 6, 7, 8, 9, the shelf members 16 may be specially shaped. Examples of design variations include triangular shaped 52, rectangular shaped 54, rectangular shaped with an opening 56, and trapezoidal shaped 58 shelf members 16. It will be appreciated that while only a limited number of shelf member designs are shown and described herein, the shelf members 16 may be specially shaped to incorporate a virtually limitless number of design variations. Furthermore, a pad or mat (not shown) can be removably attached to the top side 44 a shelf member 16 for a small animal to rest upon.

Figure 10:
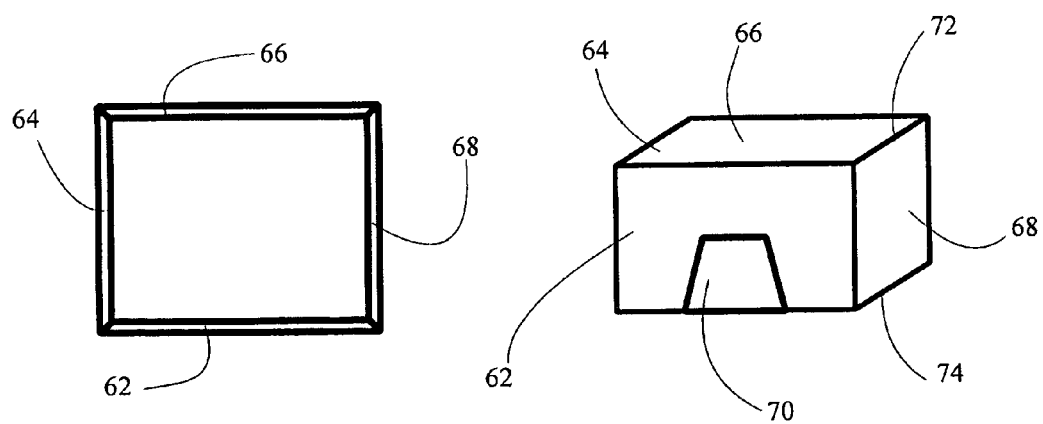
FIG. 10 are top and side perspective views of the enclosure in accordance with the preferred embodiments of the present invention.
Figure 11:
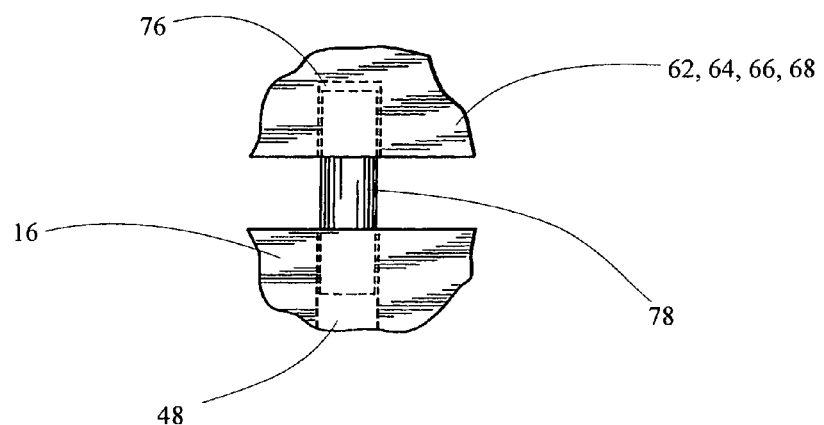
FIG. 11 is a side perspective view of the enclosure wall, dowel and shelf member in accordance with the preferred embodiments of the present invention.

As shown in FIG. 1, the design of the structure 10 can also include an enclosure 60. Referring to FIGS. 10, 11, the enclosure 60 is comprised of a first wall 62, a second wall 64, a third wall 66 and a fourth wall 68. Each of the walls 62, 64, 66, 68 are rectangular shaped having a top end 72 and a bottom end 74 of varying height with at least one of the walls containing a opening 70. A plurality of circular openings 76 are contained on both the top end 72 and the bottom end 74 of the walls 62, 64, 66, 68 into which the first end of a dowel 78 is inserted. The second end of the dowels 78 are removably maintained within the corresponding shelf assembly holes 48. Through the use of the dowels 78, the walls 62, 64, 66, 68 can be maintained between shelf members 16 thereby creating an enclosed room.

Figure 13:
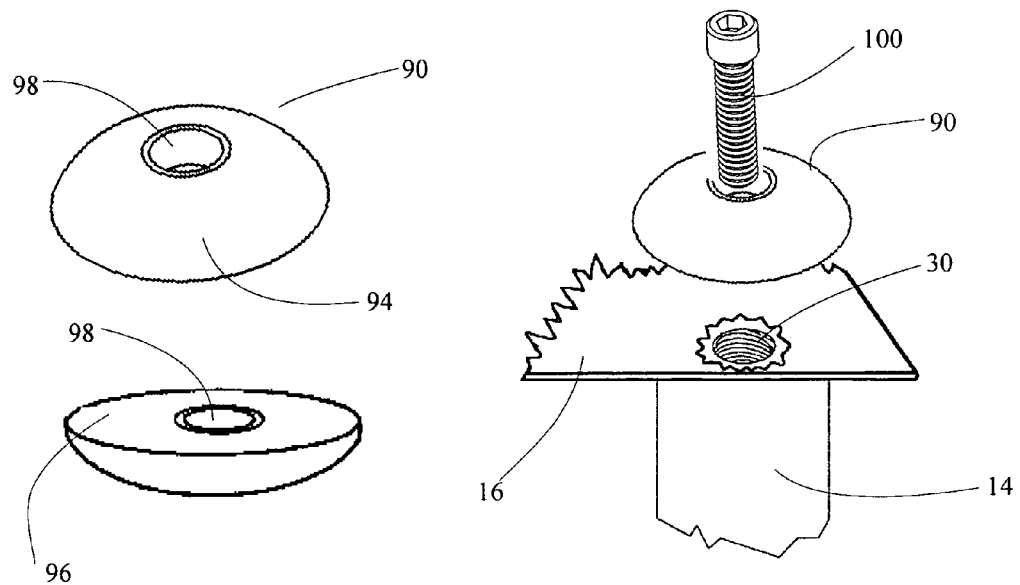
FIG. 13 are perspective views of the top cap in accordance with the preferred embodiments of the present invention.
Figure 14:
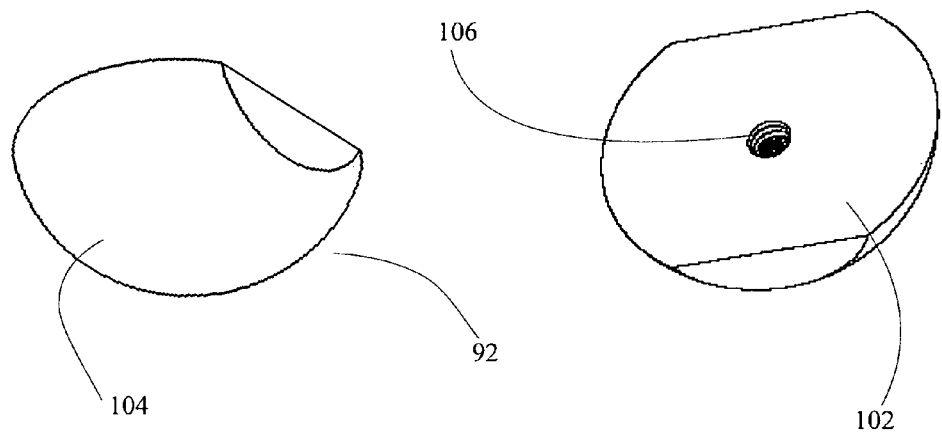
FIG. 14 are perspective views of the bottom cap in accordance with the preferred embodiments of the present invention.

FIGS. 13 and 14 illustrate a top cap 90 and a bottom cap 92 which are to be utilized when the first 20 or second end 22 of a spacer 14 is not removably attached to the base member 12 or another spacer 14. Referring to FIG. 13, the top cap 90 has a rounded top side 94 and a flat bottom side 96. A cylindrical opening 98 extends from the top side 94 to the bottom side 96 of the top cap 90. The cylindrical opening 98 is aligned with the shelf assembly hole 48 and the threaded recess 30 of the spacer 14. A bolt 100 is inserted through the top cap 90 opening 98 and the shelf assembly hole 48 to be threadably received within the threaded recess 30 of the spacer 14.

Referring to FIG. 14, the bottom cap 92 has a flat top side 102 and rounded bottom side 104. A threaded recess 106 is maintained within the interior area of the top side 102 of the bottom cap 92. The threaded recess 106 comprises a circular collar having a threaded axial recess defining an interior cylindrical wall for threadably receiving the threaded portion 28 of a spacer's 14 male connector 26.

Figure 12:
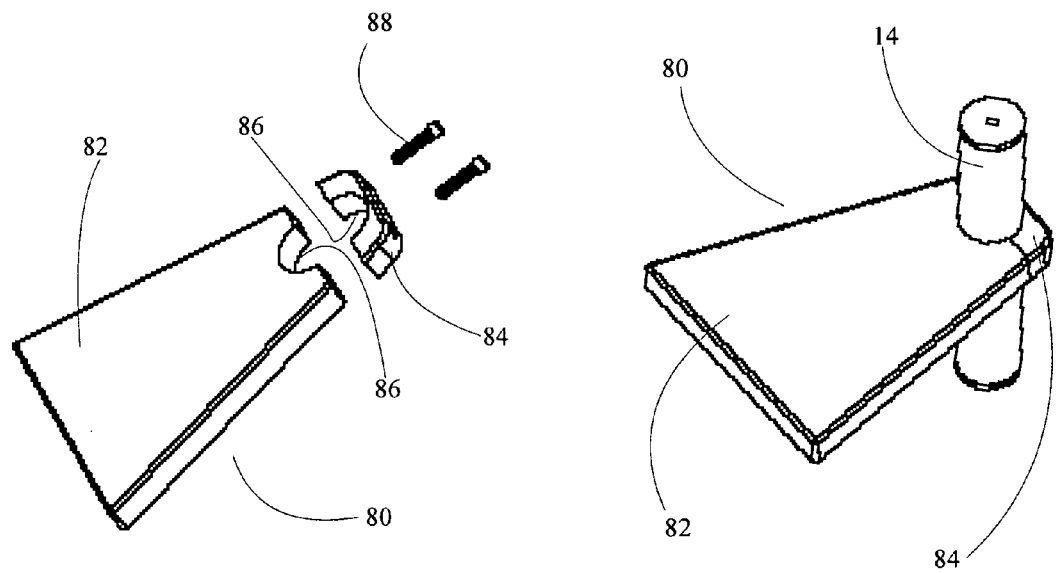
FIG. 12 is a perspective view of the step in accordance with the preferred embodiments of the present invention.

Referring to FIG. 12, a trapezoid shaped step member 80 can be incorporated into the structure 10. The step 80 is comprised of a front end 82 and a back end 84. Both the front end 82 and the back end 84 contain circular arc openings 86, which, when joined together, form a circular opening having a circumference equal to that of the tubular spacer 14. To removably attach the step 80 to a tubular spacer 14, the front end 82 is seperated from the back end 84 with the circular arc openings 86 of each end 82, 84 properly aligned around the tubular spacer 14 as illustrated in FIG. 12. The front end 82 and the back end 84 are then removably attached with appropriate attachment means, such as screws 88.

During assembly of the structure 10, threaded male connectors 26 of a first set of spacers 14 are threadably inserted into the threaded recesses 18 of the base member 12. Assembly holes 48 of a shelf member 16 are aligned with the threaded recesses 30 of the first set of spacers 14. The threaded male connectors 26 of a second set of spacers 14 are then passed through the assembly holes 48 of the shelf member 16 and threadably inserted into the threaded recesses 30 of the first set of spacers 14. This process can be repeated using a variety of spacers 14 and shelving members 16 until the desired configuration of the play structure 10 is achieved.

In its most basic form, the present invention is a modular display or animal play structure 10 with a multiplicity of configurations which are able to be modified quickly and easily using the spacers 14 and shelving members 16. The modular nature of the structure 10 allows the use of one or more base members 12 to be interconnected together by any size and number of spacers 14 and shelving members 12, thus forming an entirely custom configured network of levels and passages. Once the structure 10 is built, the owner can add shelf members 16, spacers 14, or entire base units 12 as desired to change the shape of the structure.

The structure 10 can be easily disassembled entirely or in part because of the threaded spacers 14. The owner simply disengages the spacers 14 from one another and removes the shelf members 16. The structure 10 components are compactly sized for easy storage, and are relatively light weight for carrying convenience.

Although the best mode contemplated by the inventor of carrying out the present invention is disclosed above, practice of the present invention is not limited thereto. It will be manifest that various additions, modifications and rearrangements of the features of the present invention may be made without deviating from the spirit and scope of the underlying inventive concept. In particular, the addition of ramps or steps extending between shelf members 16 or between the flooring surface and a shelf member 16.

| Index of Elements for Multi-Configuration Animal Play Structure | |
|---|---|
| 10 | Animal Play Structure |
| 12 | Base Member |
| 14 | Cylindrical Tubular Spacer |
| 16 | Shelf Member |
| 18 | Threaded Recess |
| 20 | Spacer First End |
| 22 | Spacer Second End |
| 24 | Spacer Perimeter |
| 26 | Male Connector |
| 28 | Threads of Male Connector |
| 30 | Threaded Recess |
| 32 | Circular Collar of Threaded Recess |
| 34 | Threaded Axial Recess |
| 36 | Interior Cylindrical Wall |
| 38 | Circular Collar |
| 40 | Threaded Axial Recess |
| 42 | Interior Cylindrical Wall |
| 44 | Shelf Top Side |
| 46 | Shelf Bottom Side |
| 48 | Shelf Assembly Hole |
| 50 | |
| 52 | Triangular Shaped Shelf Member |
| 54 | Rectangular Shaped Shelf Member |
| 56 | Rectangular With Opening Shelf |
| 58 | Cat Walk Shelf Member |
| 60 | Enclosures |
| 62 | First Enclosure Wall |
| 64 | Second Enclosure Wall |
| 66 | Third Enclosure Wall |
| 68 | Fourth Enclosure Wall |
| 70 | First Wall Opening |
| 72 | Wall Top End |
| 74 | Wall Bottom End |
| 76 | Wall Circular Openings |
| 78 | Dowel |
| 80 | Step |
| 82 | Step Front End |
| 84 | Step Back End |
| 86 | Circular Arcs |
| 88 | Step Screws |
| 90 | Top Cap |
| 92 | Bottom Cap |
| 94 | Top Cap Top Side |
| 96 | Top Cap Bottom Side |
| 98 | Cylindrical Opening |
| 100 | Bolt |
| 102 | Bottom Cap Top Side |
| 104 | Bottom Cap Bottom Side |
| 106 | Threaded Recess |

What is claimed is:

1. A multi-configuration animal play structure, comprising:
   a base member containing a plurality of recesses;
   a plurality of tubular-shaped spacers of differing heights which spacers have a first end defining a male connector and an opposing second end defining a recess enabling adjacent spacers to be connected in a linear orientation;
   a plurality of shelf members with each shelf member having a top side, a bottom side and a plurality of assembly holes, which holes are of sufficient size so as to allow passage of the male connectors of the spacers with the shelf members interposed between the first ends and second ends of adjacent spacers with each shelf member supported by at least three spacers; and
   a plurality of rectangular wall members having a top end and a bottom end with circular openings in both the top end and the bottom end.

2. The device of claim 1 wherein the wall members are maintained between shelf members to create an enclosed area.

3. The device of claim 1 wherein at least one of the wall members contains an opening to allow a small animal to enter the area enclosed by the wall members.

* * * * *